(No Model.) 7 Sheets—Sheet 1.

W. F. STANLEY.
MACHINE FOR MEASURING THE HEIGHT OF HUMAN BODIES AUTOMATICALLY.

No. 404,317. Patented May 28, 1889.

Witnesses.
Percy B. Hill
Robert Pratt

Inventor.
William F. Stanley
By James L. Norris
Atty.

(No Model.) 7 Sheets—Sheet 2.

W. F. STANLEY.
MACHINE FOR MEASURING THE HEIGHT OF HUMAN BODIES AUTOMATICALLY.

No. 404,317. Patented May 28, 1889.

(No Model.)

W. F. STANLEY.

MACHINE FOR MEASURING THE HEIGHT OF HUMAN BODIES AUTOMATICALLY.

No. 404,317. Patented May 28, 1889.

(No Model.) 7 Sheets—Sheet 5.

W. F. STANLEY.
MACHINE FOR MEASURING THE HEIGHT OF HUMAN BODIES AUTOMATICALLY.

No. 404,317. Patented May 28, 1889.

Witnesses:
Percy B. Hills
Robert Everett

Inventor:
William F. Stanley
By James L. Norris
Atty.

(No Model.) 7 Sheets—Sheet 6.
W. F. STANLEY.
MACHINE FOR MEASURING THE HEIGHT OF HUMAN BODIES
AUTOMATICALLY.
No. 404,317. Patented May 28, 1889.
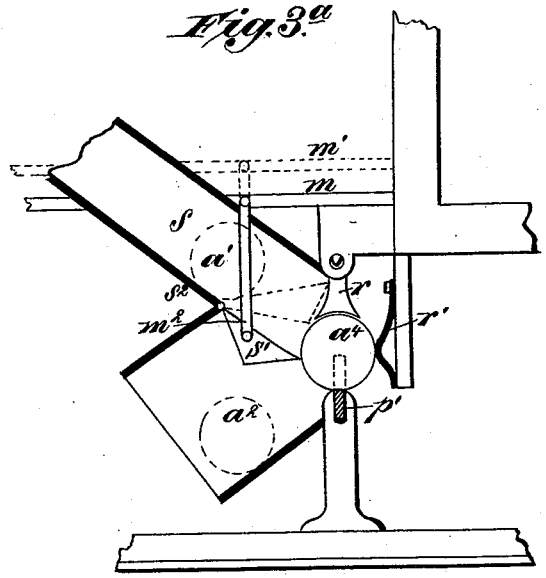
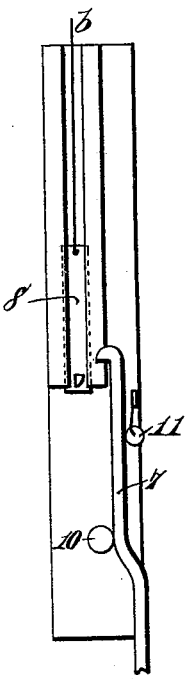
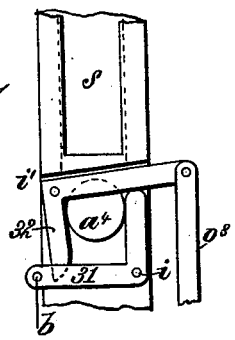
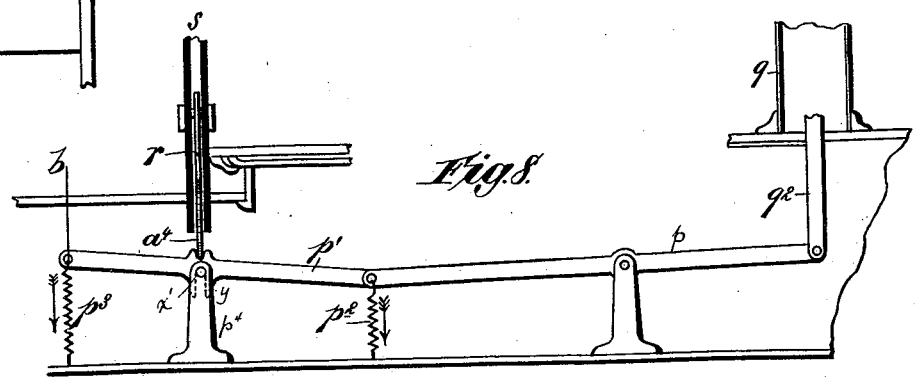
Witnesses.
Percy B. Hills.
Robert Everett.
Inventor:
William F. Stanley.
By James L. Norris
Atty.

(No Model.)

W. F. STANLEY.
MACHINE FOR MEASURING THE HEIGHT OF HUMAN BODIES AUTOMATICALLY.

No. 404,317. Patented May 28, 1889.

7 Sheets—Sheet 7.

Witnesses.
Percy B. Hills.
Robert Everett.

Inventor.
William F. Stanley,
By James L. Norris.
Atty.

UNITED STATES PATENT OFFICE.

WILLIAM FORD STANLEY, OF SOUTH NORWOOD, COUNTY OF SURREY, ENGLAND.

MACHINE FOR MEASURING THE HEIGHT OF HUMAN BODIES AUTOMATICALLY.

SPECIFICATION forming part of Letters Patent No. 404,317, dated May 28, 1889.

Application filed December 6, 1887. Serial No. 257,139. (No model.) Patented in England April 5, 1886, No. 4,726.

*To all whom it may concern:*

Be it known that I, WILLIAM FORD STANLEY, engineer, a subject of the Queen of Great Britain, residing at Cumberlow, South Norwood, Surrey, England, have invented certain new and useful Improvements in Height-Measuring Machines, (for which I have obtained a patent in Great Britain, No. 4,726, bearing date April 5, 1886,) of which the following is a specification.

This invention has for its object to provide novel mechanism for automatically indicating or measuring the height of a person by the insertion of a coin into the apparatus on a part of which a person stands. This object I accomplish by the combination of devices hereinafter described and claimed, reference being made to the accompanying drawings, illustrating my invention, in which—

Figure 1:
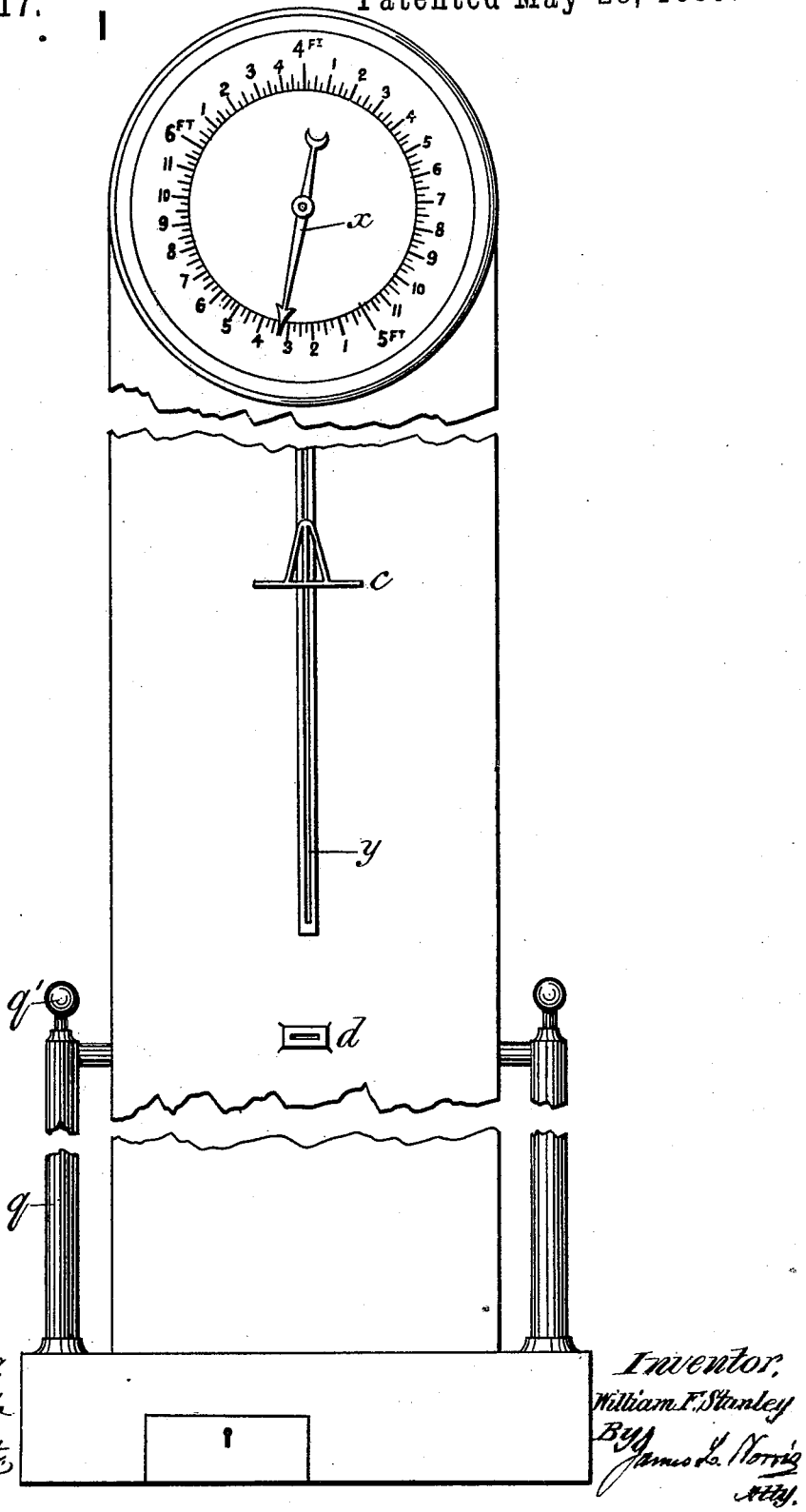
Figure 2:
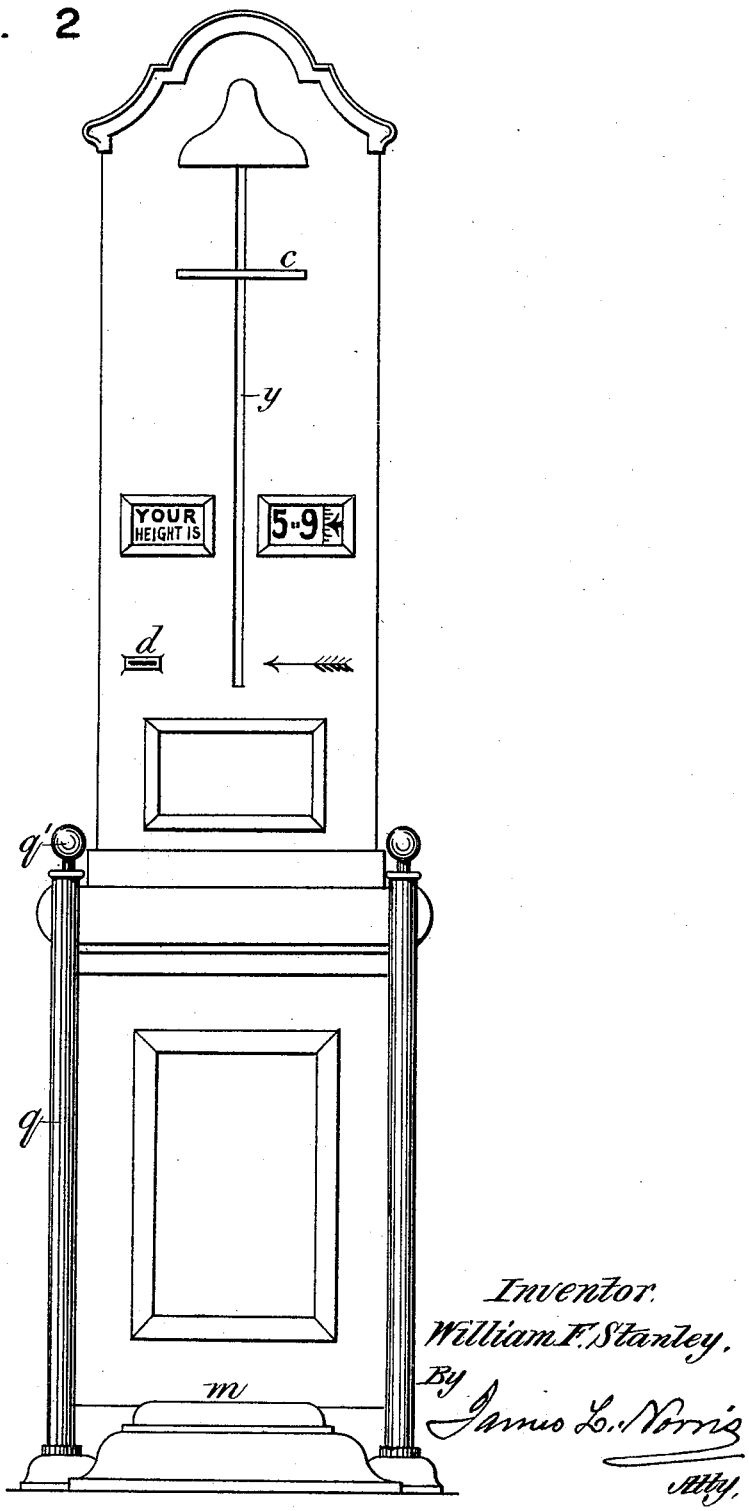
Figure 3:
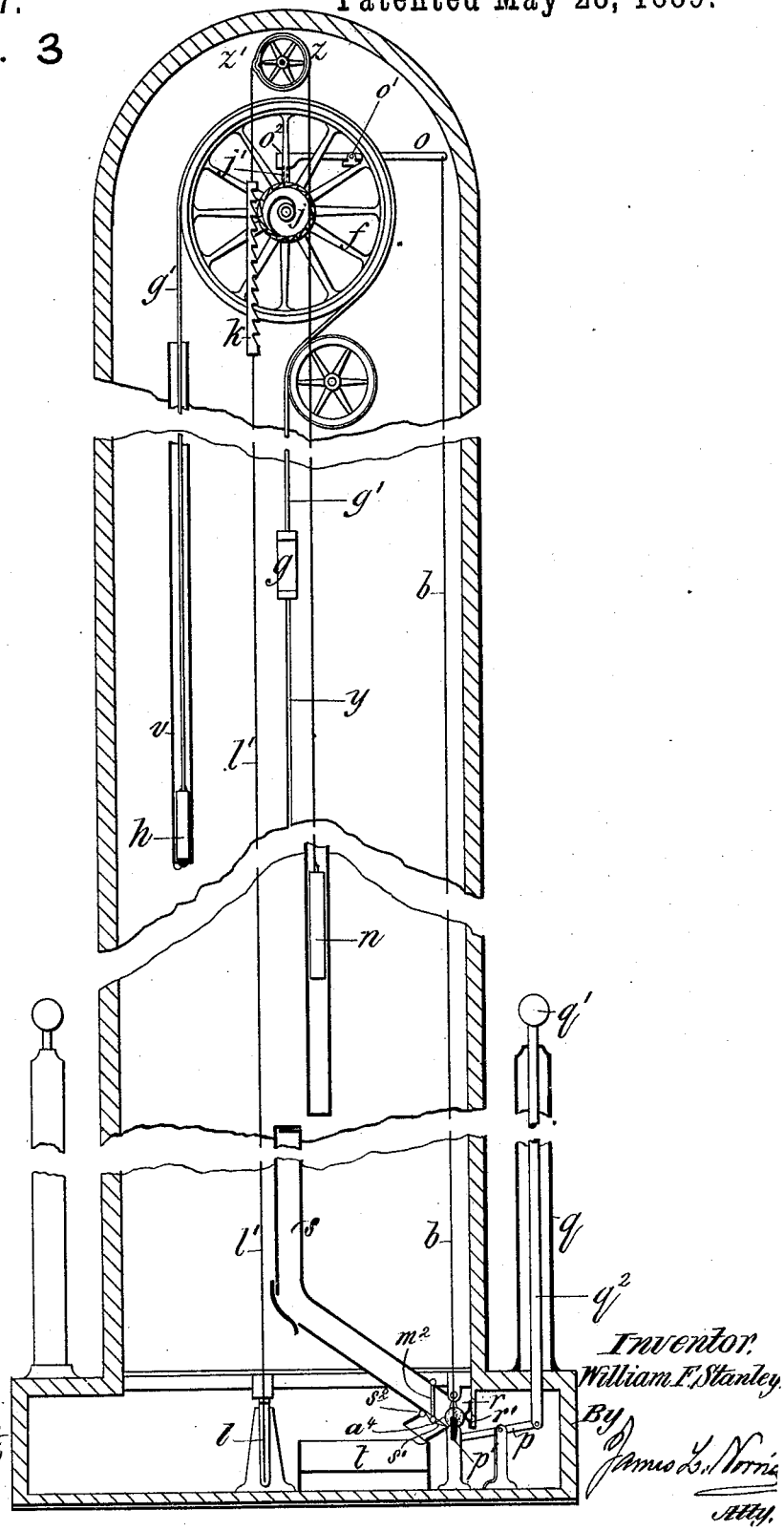
Figure 4:
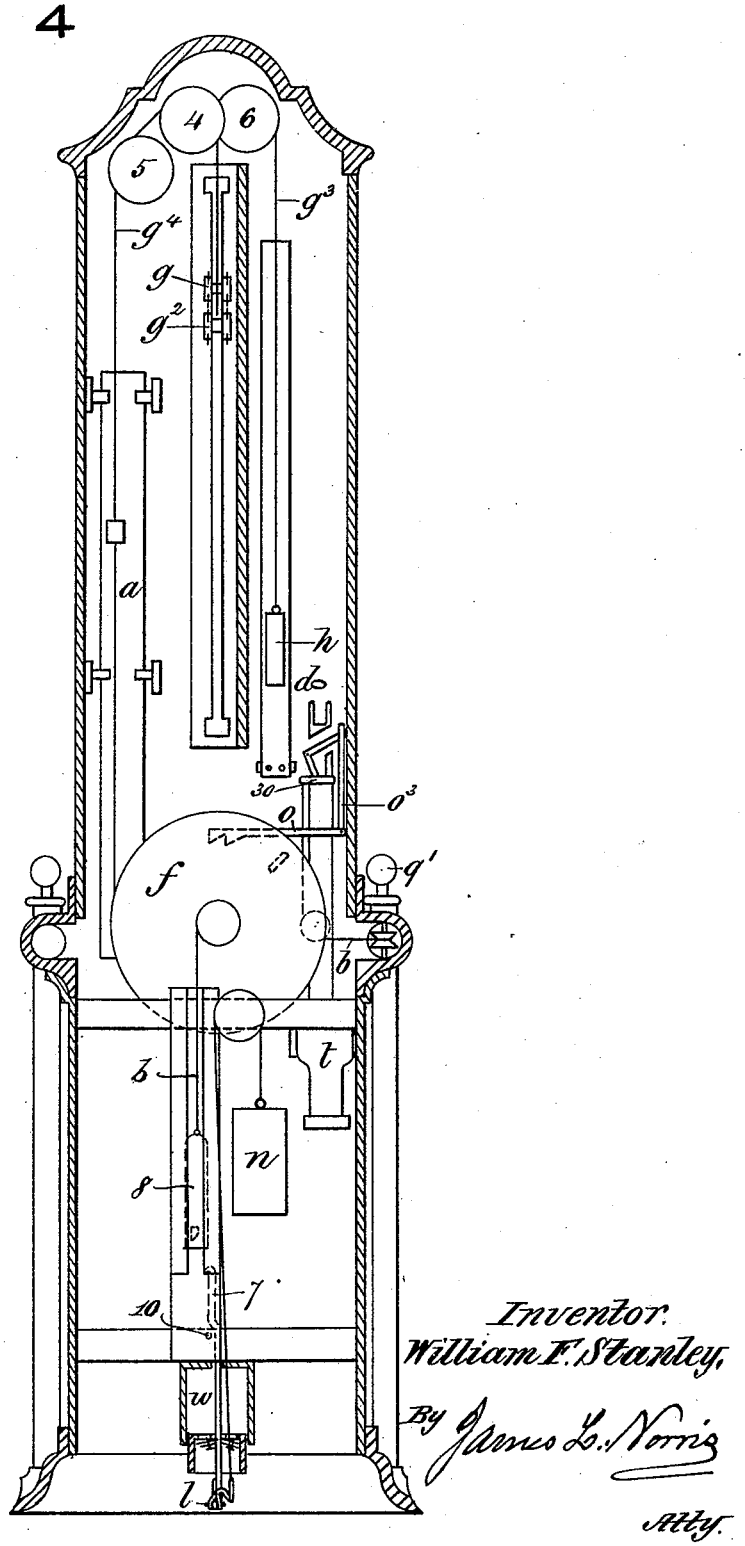

Figure 1 is a broken front elevation of the apparatus in which the height-indicator is composed of a rotating index or pointer on a circular scale. Fig. 2 is a front elevation of the apparatus in which the height-indicator is composed of a straight scale sliding behind the sight-hole. Fig. 3 is a rear inside view of Fig. 1, the back part of the case being removed. Fig. 3$^a$ is an enlarged view of the lower end of the coin-chute and other parts where the coin acts as a fulcrum. Fig. 4 is a similar inside view of Fig. 2. Figs. 5 to 10 are detail views, hereinafter explained.

Referring to Fig. 3, the letter $f$ indicates a wheel fitted to the spindle of the height-indicator or index $x$, shown in Fig. 1; $o$, a lever having its fulcrum at $o'$ and a detent at $o^2$ to release the wheel $f$ by the coin-releasing mechanism, hereinafter described.

$g$ indicates a sliding carriage carrying the ascending and descending head-plate $c$. The connection between the carriage $g$ and the plate $c$ passes through a slot, $y$, in the front wall of the case.

$h$ is a weight which tends to counterbalance the weight of the carriage $g$ and head-plate $c$, the said carriage $g$ being slightly heavier than the weight $h$. A cord, $g'$, passes round the wheel $f$, one end of which cord sustains the carriage $g$ and the other end is attached to the weight $h$, which travels in a tube $v$.

$k$ is a toothed rack or ratchet-bar gearing onto the ratchet-wheel $j$ and suspended by a cord passing over the wheel $z$, and continued to the balance-weight $n$, sliding in a tube. The balance-weight $n$ balances the rack $k$ and the lever $l$, connected with the platform $m$.

$s$ is a flattened tube which receives the coin and guides it to the position shown at $a^4$, where it acts as a fulcrum to the lever $p'$, Figs. 3$^a$ and 8. When no person is standing upon the platform $m$, it assumes its normal raised position (shown by dotted lines $m'$ in Fig. 3$^a$;) but when depressed by a person standing thereon it assumes the position shown by full lines in the same figure.

$m^2$ indicates a link which extends outside the flat tube $s$, and at its lower end engages the movable plate $s'$ inside the tube, the movable plate $s'$ being pivoted at $s^2$.

On the insertion of a coin in the slot it runs down the tube $s$, and when the platform is in the position shown by dotted lines $m'$, Fig. 3$^a$, the coin is stopped by the plate $s'$ and remains in the position shown by dotted lines at $a'$. On the depression of the platform $m$ to the position shown by full lines the plate $s'$ is lowered to the position shown by full lines. The coin then moves to the position shown at $a^4$, where it enters a notch or gap in the lever $p'$, to which lever it acts as a temporary fulcrum, as shown in Figs. 3, 3$^a$, and 8.

$r$ is a pivoted swinging catch, serving to hold down the coin in the notch or gap of the lever $p'$. The spring $r'$ acts as a check to the side of the coin opposite to the plate $s'$. When the platform rises again by the removal of the person's weight, the plate $s'$ is raised and the coin falls into a suitable receptacle, its falling position being shown at $a^2$.

In Fig. 3 the two levers $p$ and $p'$ are shown in their correct relative positions at or nearly at right angles to each other; but in Fig. 8 they are shown substantially in line with each other for greater clearness. The springs $p^2$ and $p^3$ both act in a downward direction, tending to restore the levers to their normal positions when released. The lever $p'$ has a notch, $y$, in its under side, as shown by dotted lines in Fig. 8, so that it may straddle a pin, X', in the standard $p^4$, and thus the center of the lever can be moved vertically when there is no coin in the notch to act as a fulcrum without imparting action to the lever $o$.

On one side of the platform is a tubular pillar, $q$, having a knob, $q'$, at the top of a vertical spindle, $q^2$, connected with the lever $p$. When the coin is in the position shown in Figs. 3, 3ª, and 8, the knob $q'$ is pressed downward, and this movement, through the levers $p$ and $p'$, acts upon the lever $o$ by means of the cord $b$. The lever $o$ at the same time releases the wheel $f$, which is then turned by the cord $g'$, actuated by the carriage $g$, thereby causing the head-plate $c$ to descend until it rests upon the head of the person standing on the platform $m$. When the person gets off the platform, the latter rises to the position shown by dotted lines $m'$, Fig. 3ª. The coin then falls out and the levers $p$ $p'$ resume their normal position.

Figure 9:
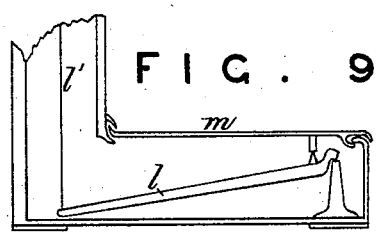

In addition to the mechanism attached to the platform shown in Fig. 3ª, a lever, $l$, is acted on by the platform, as shown in Fig. 9. When the person stands on the platform, this lever is depressed and this draws down the cord $l'$, attached to the rack $k$. The rack $k$ being then in gear with the ratchet-wheel $j$, the wheel $f$ and the height-indicating index or finger $x$ are turned until the height-indicating hand $x$ arrives at zero on the circular scale, and the tooth $j'$ of the wheel $j$ engages the detent $o^2$ of the lever $o$. The wheel $z$ turns with the rise of the rack $k$ until the projection $z'$ throws the rack $k$ out of gear and away from the ratchet-wheel $j$. The hand $x$ being then at zero and the rack $k$ out of gear, the apparatus is ready for a repetition of the operation, which takes place, as before explained.

Figure 10:
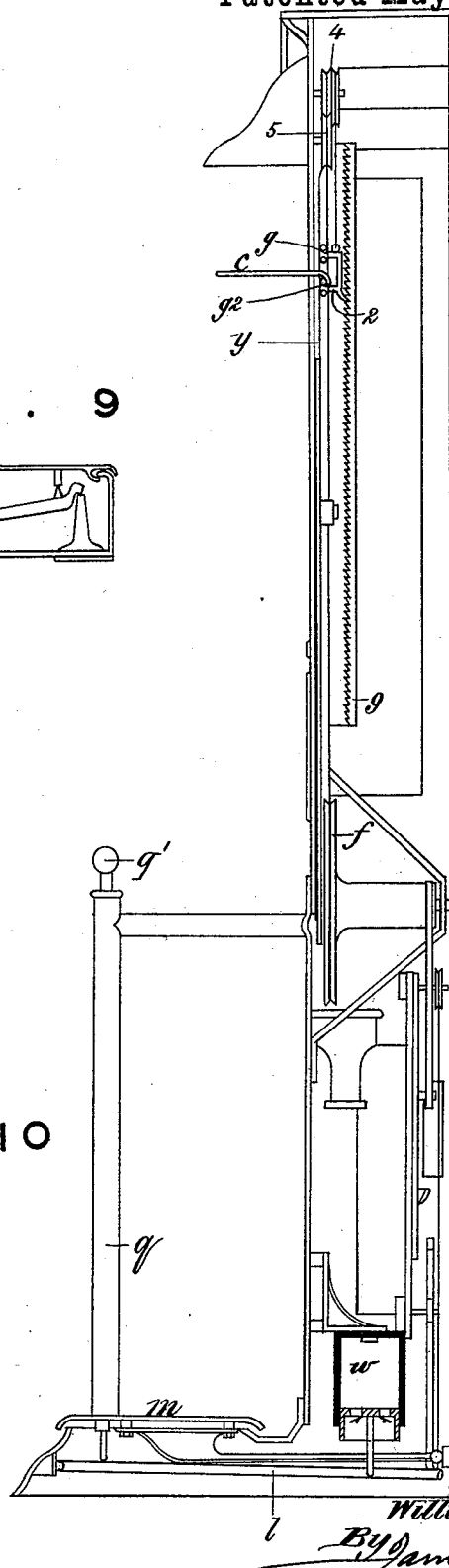

I sometimes fit two carriages, $g$ $g^2$, (instead of one,) as shown in Figs. 4 and 10. These two carriages are also shown enlarged in Fig. 5. The head-plate $c$ is fitted to the upper carriage, $g$. Both carriages are guided in the case and may be fitted with friction wheels or rollers, as shown.

Figure 5:
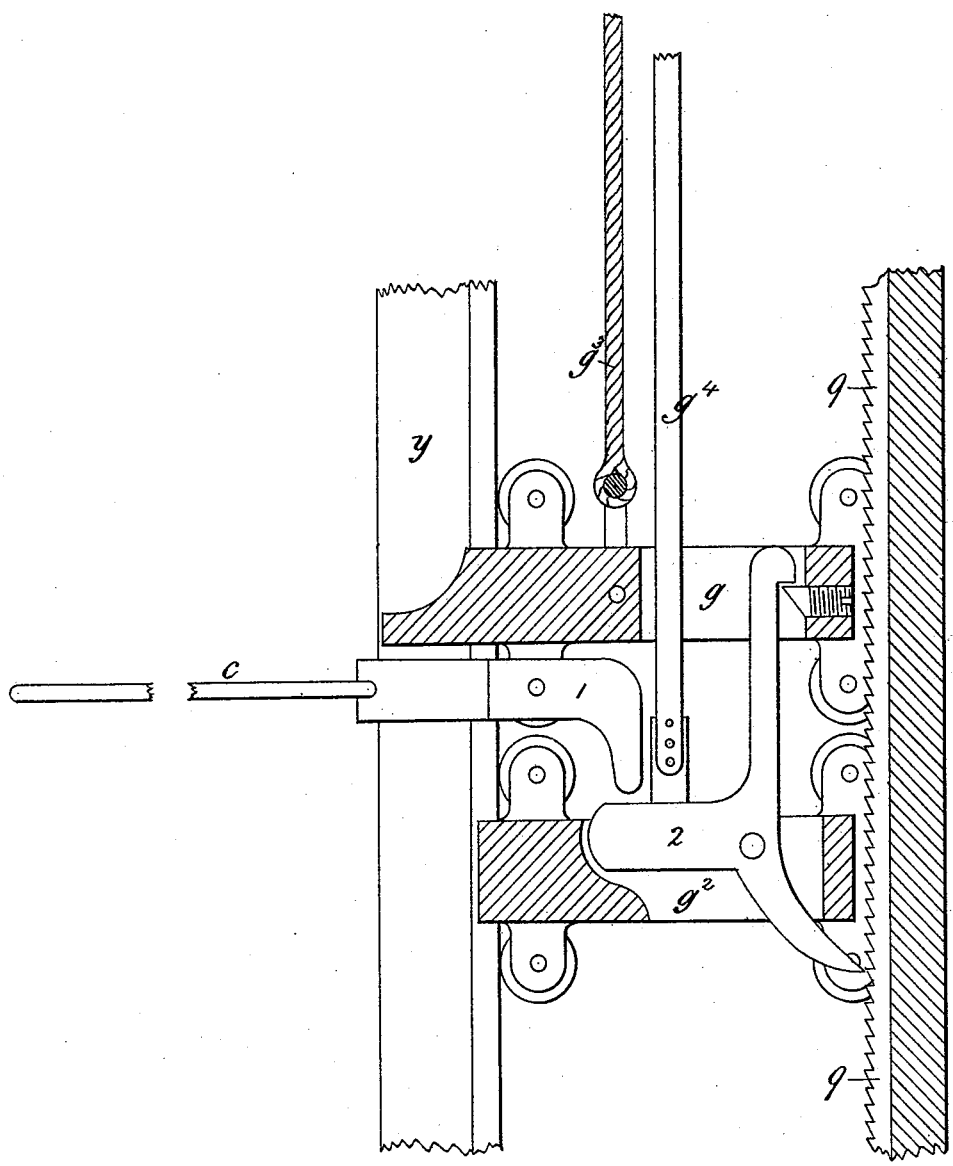

Referring to Figs. 4, 5, and 10, $g^4$ is the cord or band sustaining the lower carriage, $g^2$. This band passes over the pulleys 4 and 5, Fig. 4, and is attached to the sliding height indicator or scale $a$. The carriage $g^2$ is heavier than the sliding height indicator or scale $a$.

$g^3$ is the cord attached to the carriage $g$. This cord $g^3$ passes over the pulley 6 and descends to the weight $h$, the upper carriage, $g$, being lighter than the weight $h$.

When the person steps upon the platform, the lever $l$ draws down the clutch 7, Figs. 4 and 6, attached to the lever $l$, and the clutch 7 draws down the catch 8 a certain distance until it is engaged by the pin 10, as shown enlarged in Fig. 6. The two carriages then descend together until the plate $c$ touches the head of the person. When this occurs, the lever 1, Fig. 5, turns slightly on its pivot and touches the lever 2, which turns on its pivot. The lower end of the lever 2 then catches in a tooth of the rack 9, retaining the carriage $g^2$ in position. The upper end of the lever 2 at the same time releases the carriage $g$, as will be readily understood on reference to Fig. 5. The carriage $g$ is immediately raised by the weight $h$, leaving the carriage $g^2$ stationary, indicating the height of the person.

Referring to Figs. 4 and 10, the wheel $f$ may be used (instead of the scale $a$) to indicate the height of the person, the cord $g^4$ being passed round its groove for that purpose, and a hand or indicator being fitted to its axle in front of the case. Fig. 10 is a sectional elevation of device shown in Fig. 4. The head-plate is put back to zero by the clutch arrangement and pulley shown in Figs. 4 and 6, actuated by the lever $l$, the lever $l$ being actuated by the platform $m$, and the whole being counterbalanced by the weight $n$. A dash-pot arrangement, $w$, is fitted to check the too rapid descent of the lever $l$ and platform.

In Fig. 6 is shown another method for returning the index to zero, which may be actuated by the weight of a person getting on or off the platform.

In Fig. 6 the hook 7 is attached to the lever of the platform, as in Fig. 4, and the cord or chain $b$ to the pulley $f$ or measuring-wheel of the machine. When the head-plate descends, the chain $b$ is wound round the pulley, thus raising the slide 8, carrying the catch. When the person gets off the platform, the hook 7 is raised by the platform-lever above the catch on the slide 8, and when the next person gets on the platform it is again depressed, carrying the catch slide and chain with it until it reaches zero, when the hook is thrown off by the bend or shoulder of the hook 7, coming in contact with the pin 10. 11 is a spring which presses a button against the hook 7. The position of this hook is shown in Fig. 4.

Fig. 7 is an enlarged drawing of the arrangement shown in Fig. 4. $a^4$ is the coin, which has descended through the open-sided tube $s$. The bell-crank lever 31 is pivoted at $i$, and the cord $b$ is connected with the spindle of the knob $q'$. The bell-crank lever 32 is pivoted at $i'$, and the rod $o^3$ is connected with the detent-lever $o$. The coin $a^4$ being between the two levers, as shown, the motion of the lever 31 is communicated to 32, and by the latter through the rod $o^3$ to the detent-lever $o$ for releasing the wheel $f$.

For naval and military and other official purposes the coin mechanism may be dispensed with.

What I claim is—

1. In a machine for measuring the height of a person, the combination of a rotary height-indicator, a descending and ascending head-plate to be brought in contact with the head of the person, and mechanism, substantially as specified, for connecting the head-plate and height-indicator, whereby said indicator is automatically operated by the movements of the head-plate, substantially as described.

2. The combination, in a machine for measuring the height of a person, of a movable platform on which the person stands, a movable height-indicator, a descending and ascending head-plate to be brought in contact with the head of the person, and mechanism for operating the head-plate and the height-indicator from the platform, substantially as described.

3. The combination, in a machine for measuring the height of a person, of a movable platform on which the person stands, a descending and ascending head-plate to be brought in contact with the head of the person, a height-indicator, and mechanism for actuating the head-plate and the height-indicator from the platform, and a tube for the conduct of a coin to act on said mechanism to put it into action, substantially as described.

4. The combination, in a machine for indicating the height of a person, of a vertically-movable carriage, a descending and ascending head-plate connected with the carriage, a suspended weight which tends to counterbalance the carriage and head-plate, a movable height-indicator, and mechanism which actuates the height-indicator by the movement of the head-plate, substantially as described.

5. The combination, in a machine for indicating the height of a person, of a casing, a movable platform, a vertically-movable carriage, a head-plate connected to and movable with the carriage, mechanism for bringing the head-plate into action, a tube for the conduct of a coin to render said mechanism operative, a suspended weight which tends to counterbalance the carriage and head-plate, a movable height-indicator, and mechanism which moves the height-indicator by the movement of the head-plate, substantially as described.

6. The combination, in a machine for indicating the height of a person, of a height-indicator, a movable platform, connections between the platform and height-indicator, a descending and ascending head-plate which actuates the height-indicator, mechanism for bringing the head-plate into action, and a tube for the conduct of a coin to render said mechanism operative, substantially as described.

7. The combination, in a machine for indicating the height of a person, of a descending and ascending head-plate, a height-indicator, a movable platform, and mechanism operated by the platform to move the head-plate and height-indicator to indicate the height of a person, substantially as described.

Dated London, November 21, 1887.

WM. FORD STANLEY.

Witnesses:
   H. G. GALLACK,
     28 *Hatton Garden, London, E. C.*
   HERBERT E. DALE,
     17 *Gracechurch Street, London, E. C.*